July 19, 1932.  C. A. LOWE  1,867,978
TIRE CHAIN
Filed May 23, 1931  2 Sheets-Sheet 1

Inventor
Cloyd A. Lowe

By Clarence A. O'Brien
Attorney

July 19, 1932.   C. A. LOWE   1,867,978
TIRE CHAIN
Filed May 23, 1931   2 Sheets-Sheet 2
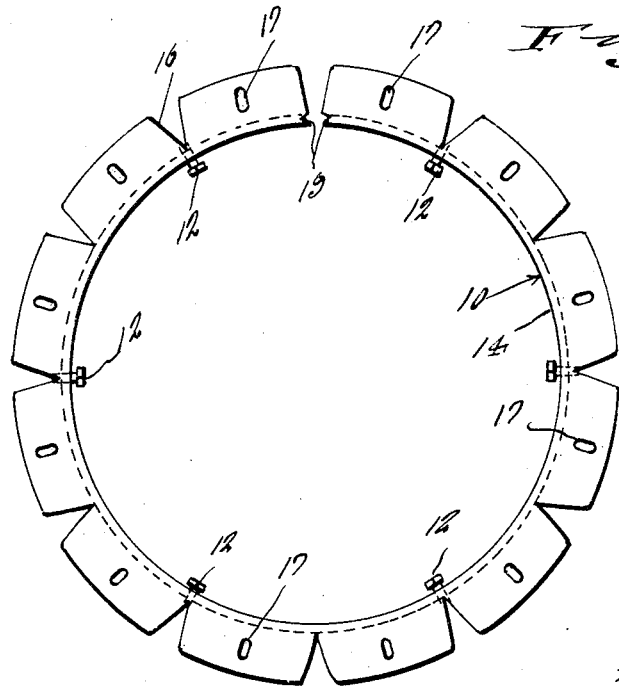
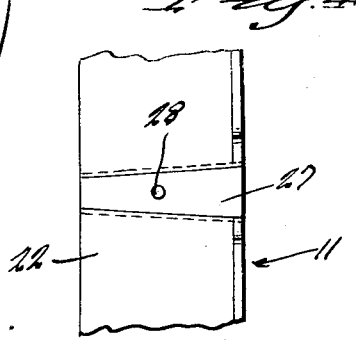
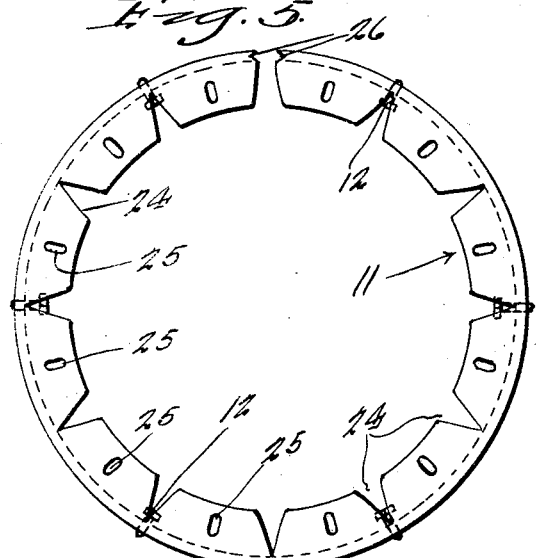
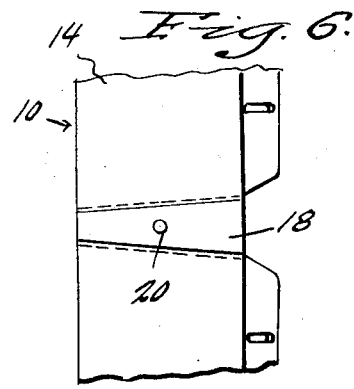
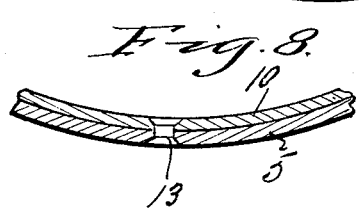
Inventor
Cloyd A. Lowe
By Clarence A. O'Brien,
Attorney Patented July 19, 1932

1,867,978

UNITED STATES PATENT OFFICE

CLOYD A. LOWE, OF DAYTON, OHIO

TIRE CHAIN

Application filed May 23, 1931. Serial No. 539,575.

This invention relates to new and useful improvements in anti-skid devices for pneumatic wheels, and the principal object of the invention is to provide an anti-skid device of the chain type particularly adapted for use on double tired wheels.

Another important object of the invention is to provide a tire case for front wheels which can be easily and conveniently placed in position for use or removed with equal facility.

These and other important objects and advantages of the invention will become apparent to the reader of the following specification.

In the drawings:—

Fig. 3 represents a side elevational view of the inboard annulus.

Fig. 4 represents a fragmentary inside elevational view of the outboard annulus, to show the wedge means.

Fig. 5 represents a side elevational view of the outboard annulus.

Fig. 6 represents a fragmentary inside elevational view of the inboard annulus to disclose the wedge means.

Fig. 7 represents a fragmentary detailed sectional view disclosing means for securing any one of the annular members in position on the wheel rim.

Fig. 8 shows a fragmentary detailed sectional view disclosing permanent means for securing the annular members to the wheel rim.

Figure 1:
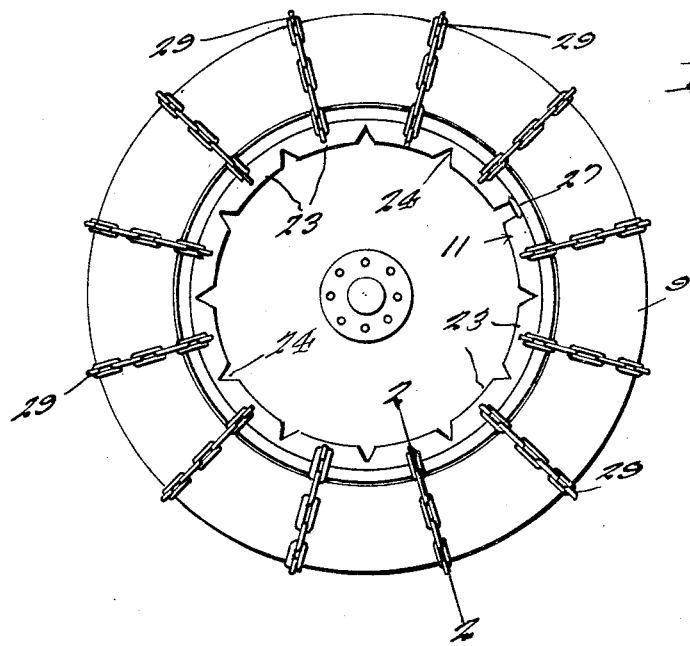
Figure 1 represents a side elevational view of the anti-skid device mounted on a wheel.
Figure 2:
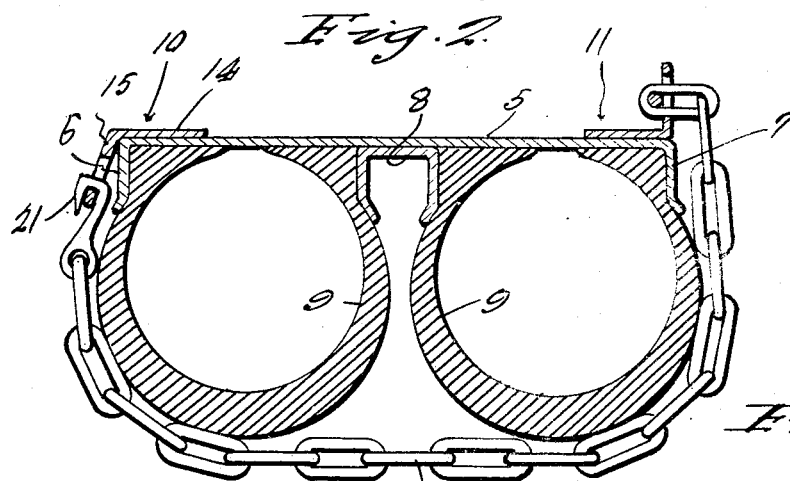
Fig. 2 represents a sectional view taken substantially on the line 2—2 of Fig. 1.
Figure 10:
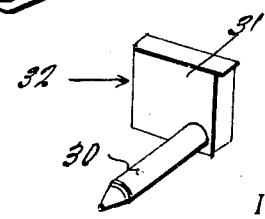
Fig. 10 represents a perspective view of the chain detent.

Referring to the drawings wherein like numerals designate like parts, it can be seen that numeral 5 represents the rim of a double tired wheel, the same being provided with the inboard flange 6 and the outboard flange 7 and with the dual flange construction 8 between the tire casings 9—9.

In carrying out the present invention, an inboard annulus 10 is provided as well as an outboard annulus 11 and each of these annular members can be provided with removable screw elements 12 for securing the same to the rim 5, or these annular members can be secured to the rim 5 permanently by rivets 13.

The inboard annulus 10 includes a split band 14 provided with an obliquely disposed flange 15, at one longitudinal edge portion thereof and as is clearly shown in Fig. 3, the flange 15 is provided with V-shaped notches 16 at spaced intervals, which of course allows the parts to assume the oblique position besides defining tongues in which the transversely extending slots 17 are located.

Obviously, where the band 14, which is slit, is temporarily secured in position by disposing the wedge element 18 in the channeled end 19, so as to spread these end portions apart, the set screws 12 are tightened against the rim 5 to secure safety against displacement of the annulus.

Of course, if the rivets 13 are employed, the screws 12 are dispensed with. Retaining elements 20 are employed on the wedge members 18 for binding engagement with the rim 5 so that these wedge members will not become accidentally disposed.

A chain section is provided for each of the aforementioned tongues of the flange 15 at one end of each chain 29 and a hook 21 mounted thereon for engagement with the corresponding tongues through the opening 17 therein.

The outboard annulus 11 includes the split band 22 which is provided with an inwardly disposed circumferentially extending flange 23, and similarly provided with V-shaped notches 24 to define tongues in which transversely extending slots 25 are located. In a similar manner, the ends of this band 23 are provided with grooves 26 to receive the wedge member 27 which is likewise provided with a detent 28 for engagement with the rim 5 so as to prevent displacement of the wedge from engagement with the corresponding annulus.

Figure 9:
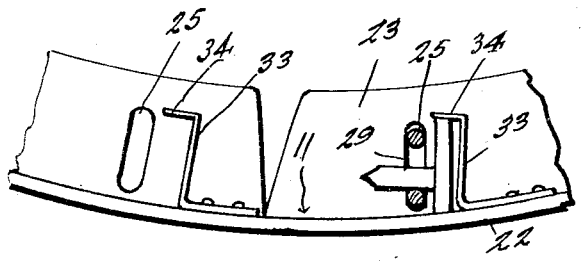
Fig. 9 represents a fragmentary detailed sectional view disclosing the detachable chain securing means.

The remaining ends of the chain sections which will be denoted by numeral 29 are disposed thru the openings 25 and the legs at these ends of the chain sections project inwardly of the flanges 23 receive the pointed pins 30 which project from the blocks 31. Each of these chain features which are generally referred to by numeral 32 includes a rectangular-shaped block 31 with the aforementioned pin 30 projecting laterally from one corner thereof. On the band 22 adjacent each tongue is an L-shaped leaf spring 33 secured to the band 22 and provided at its free end portion with a laterally disposed finger 34 which engages with the end portion of the detent generally referred to by numeral 32, remote from the end portion at which the pin 30 is located, for retaining the detent in substantially the position shown in Fig. 9.

Furthermore, the spring finger 34 engages the aforementioned portion of the block 31 and at a point immediately above the pin 30, so that when the block 31 is swung outwardly so that the last-mentioned end portion is projecting outwardly of the annulus, the ends of the block at which the pin 30 is located will be free from the spring 33 so that it can be readily moved to disengage the pin 30 from the corresponding link of the particular chain section.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. An anti-skid device for wheels comprising a pair of flanged annular members, each of which is provided with openings in the flanges thereof, a plurality of chain sections, each of said chain sections being provided with a hook at one end for engagement through the openings on one of the flanges, the openings of the other flange being provided to receive the remaining ends of the chain sections, a detent for securing the last-mentioned ends of the sections to the corresponding annulus, said means comprising a spring member adjacent each opening of the flange, block members, each of said block members being engageable by one of these springs, and a pin on each of the block members projecting from one corner thereof for disposition through a link of the chain sections of the corresponding end thereof.

2. An anti-skid device for wheels comprising a chain section, means for securing one end of the chain section to the wheel, a flanged member on the wheel provided with an opening therein for receiving one end link of the chain section, a block, a pin projecting eccentrically from the block through the said end link, and spring means for securing the said block against movement.

3. Attaching means for chains comprising a stationary body having an opening therein for receiving a chain link, an outstanding leaf spring on the body provided with a laterally disposed end portion, a block against one edge portion of which the laterally disposed end portion is tensionally engageable, and a pin extending outwardly from the block and from one corner thereof for disposition through a link projecting through the opening in the body.

In testimony whereof I affix my signature.

CLOYD A. LOWE.